J. G. GOODHUE.
APPLIANCE FOR CHARGING DISINFECTING APPARATUS.
APPLICATION FILED FEB. 23, 1910.
1,070,681. Patented Aug. 19, 1913.
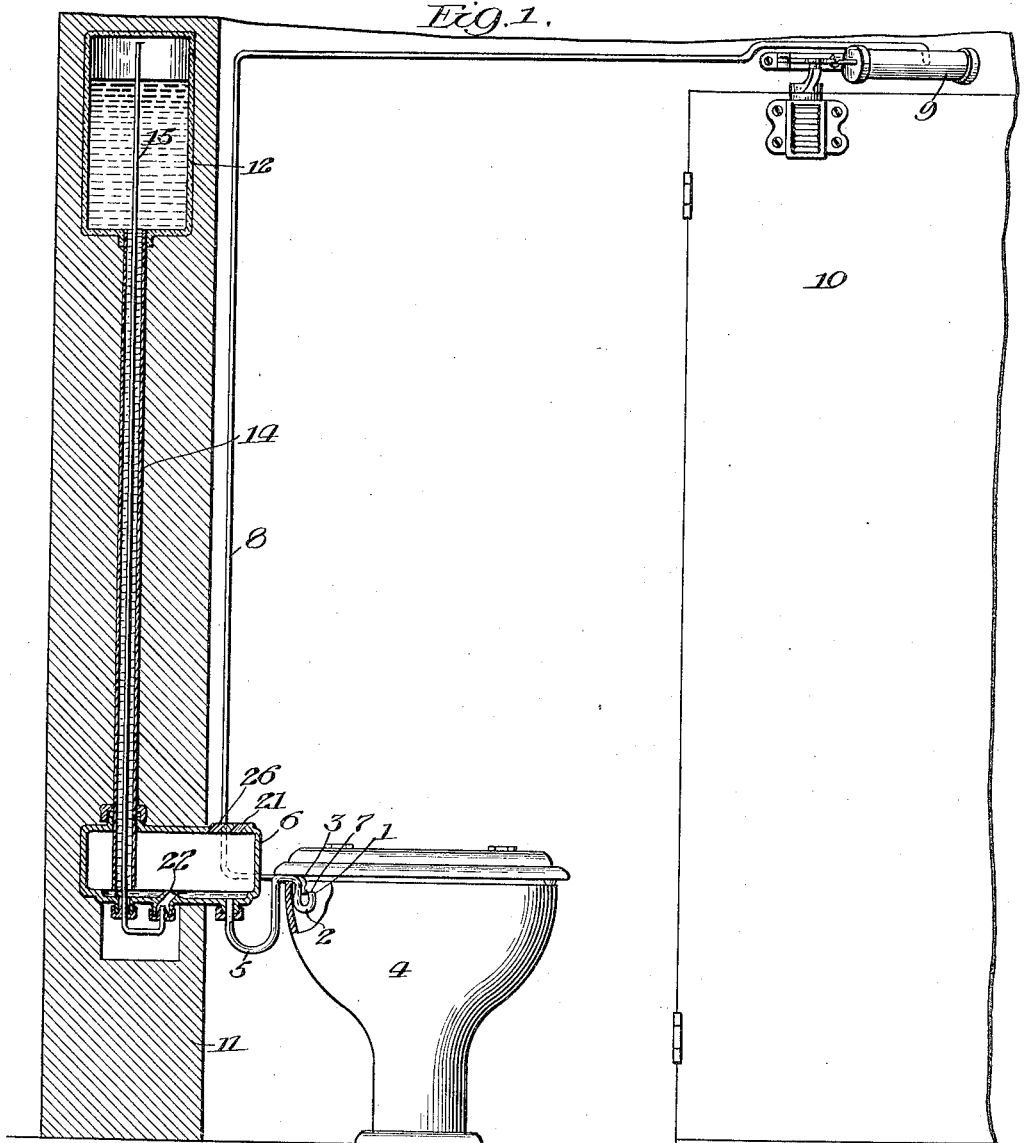
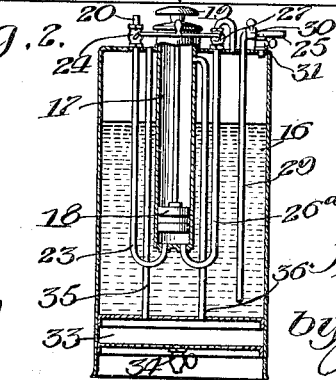

UNITED STATES PATENT OFFICE.

JULIAN G. GOODHUE, OF CHICAGO, ILLINOIS.

APPLIANCE FOR CHARGING DISINFECTING APPARATUS.

1,070,681.  Specification of Letters Patent.  Patented Aug. 19, 1913.

Application filed February 23, 1910. Serial No. 545,393.

*To all whom it may concern:*

Be it known that I, JULIAN G. GOODHUE, citizen of the United States, residing at Chicago, in the county of Cook and State of Illinois, have invented a certain new and useful Improvement in Appliances for Charging Disinfecting Apparatus, of which the following is a full, clear, concise, and exact description, reference being had to the accompanying drawings, forming a part of this specification.

My invention relates to appliances for charging disinfecting apparatus, and has for its object the provision of improved means for charging spraying devices in toilet rooms and the like, and is more particularly designed to provide an appliance which can properly charge spraying devices without the necessity of reaching them or disconnecting any parts from their normal connections.

I will describe my invention more in detail by reference to the accompanying drawing illustrating the preferred embodiment thereof, in which—

Figure 1 represents diagrammatically a spraying or disinfecting apparatus which it is desired to charge, and Fig. 2 is a vertical cross sectional view of my improved charging appliance. Fig. 3 is a detail view of the valve gear of the device shown in Fig. 2.

In the appliance which is shown in Fig. 1, which is typical of the devices with which my charging apparatus is especially designed to be used, I provide a sprayer 1, consisting of the atomizing tube 2, and the air jet tube 3, as mounted in a bowl 4 for spraying purposes. The tube 2 connects, by means of a tube 5, with an auxiliary reservoir 6, from which it gets its supply of liquid, which is adapted to flow out through an opening 7 in the atomizing tube 2. The air jet tube 3 is connected, by means of a tube 8, with a door check 9, which door check is under the control of a door 10, and sends a blast of air through the tube 8 and tube 3, when the door is opened and closed.

The auxiliary reservoir 6 is countersunk in the wall 11, and is connected with the main reservoir 12, also countersunk in the wall. The auxiliary reservoir has two openings 21 and 26, through which it communicates with the atmosphere, and which may be closed, though not hermetically sealed, if desired. A tube 14 connects the bottom of the main reservoir 12 with the auxiliary reservoir, and extends to very nearly the lowermost portion of the auxiliary reservoir 6. The lower portion of the tube 14 is elevated above the bottom of the auxiliary reservoir 6, and thereby controls the level of liquid in said auxiliary reservoir, the level of which is the same as the level of the liquid in the tube 2, and this must be slightly below the opening 7. A second tube 15 runs to the top of the main reservoir 12 and its lower open mouth is connected with the bottom of the auxiliary reservoir. When the level of the liquid falls below the mouth of the tube 14, air enters tube 14 and rises into reservoir 12 allowing sufficient liquid to flow down into the reservoir 6 to again cover the end of the tube 14. Now, in order to charge this device, I provide a pumping apparatus comprising the supply chamber 16 within which a pump 17 is mounted. This pump 17 has a piston 18 operated by means of a handle 19. When charging, the pump is connected with the tube 20 and this tube is inserted through the opening 21 until it rests against the angularly disposed mouth 22. This tube 20 connects by means of tube 23 with the cylinder of the pump through the interposition of the valve 24. A further tube 25 is inserted through the opening 26 so that the liquid can flow into the auxiliary reservoir. The cylinder of the pump also communicates by means of the pipe 26ª, through the interposition of the valve 27, with the interior of the supply chamber 16. These 2 valves, 24 and 27 are conjointly operated by the handle 28. The tube 25 connects with the supply chamber through the tube 29 a cock 30 being interposed as shown. This tube 29 has its lower mouth always within the liquid. There is further communication between the upper portion of the supply chamber 16 and the tube 25, a cock 31 being inserted to control same.

Now, when the handle 19 is raised, lever 28 is in such a position that valve 24 is open and 27 shut. This withdraws the air from the main reservoir and when the handle 19 is in its uppermost position, lever 28 is actuated to close valve 24 and open valve 27 and the handle is then moved downward and this forces the air from the cylinder into the supply chamber and the liquid is thereby forced through the tube 29 and tube 25 into the auxiliary reservoir. The partial vacuum in the main reservoir serves to draw this liquid up into its main reservoir. This operation is continued until the main reservoir is filled to the correct proportion. There is a waste chamber 33 at the bottom of the pumping apparatus controlled by the relief cock 34 and this waste chamber communicates with the atmosphere through the agency of the tube 35. This waste chamber serves through the agency of the tube 36 to collect the leakage from the rear of the piston in the cylinder chamber. Now when the apparatus is charged there may be an excessive pressure in the supply chamber and this is allowed to escape when the valve 31 is open and the valve 30 closed and this also blows the superfluous liquid out of the connecting tubes.

While I have herein shown and particularly described the preferred embodiment of my invention, I do not limit myself to the precise construction and arrangement as herein set forth, but

Having thus described my invention, what I claim as new and desire to secure by Letters Patent is:

1. In a device of the character described, a pump having a cylinder and a piston, a sealed liquid supply chamber, a valved connection between said cylinder and chamber whereby air pressure is supplied to said supply chamber, an outlet tube leading from said supply chamber, an air inlet tube for said cylinder, a false bottom in said supply chamber to form a separate receptacle, and a tube communicating with said receptacle and the nonactive side of said cylinder.

2. In a device of the character described, a pump having a cylinder and a piston, a sealed liquid supply chamber, a valved connection between said cylinder and chamber whereby air pressure is supplied to said supply chamber, an outlet tube leading from said supply chamber, an air inlet tube for said cylinder, a false bottom in said supply chamber to form a separate receptacle under atmospheric pressure, and a tube communicating with said receptacle and the nonactive side of said cylinder.

3. A charging apparatus comprising in combination, a casing inclosing a combined air and liquid chamber, a pump having a cylinder and piston mounted in said casing, an inlet pipe entering the top of said casing and connecting with said pump cylinder, an outlet pipe connecting with said pump cylinder and leading through the top of said casing and then reëntering the casing, a pair of oscillating valves mounted in said inlet and outlet pipes above the top of said casing, said valves having operating levers which are connected by an operating rod, a liquid discharge pipe leading from the bottom of said casing through the top thereof, and having a valve therein.

In witness whereof, I hereunto subscribe my name this 19th day of February A. D., 1910.

JULIAN G. GOODHUE.

Witnesses:
 MAX W. ZABEL,
 O. M. WERMICH.

Copies of this patent may be obtained for five cents each, by addressing the "Commissioner of Patents. Washington, D. C."